United States Patent [19]
Kutzner

[11] Patent Number: 5,794,683
[45] Date of Patent: Aug. 18, 1998

[54] BEVERAGE COOLER FOR AUTOMOBILE

[76] Inventor: Andrew F. Kutzner, Opelstrasse 28, D64546 - Moerfelden, Germany

[21] Appl. No.: 702,757

[22] Filed: Aug. 22, 1996

Related U.S. Application Data

[60] Provisional application No. 60/002,825 Aug. 25, 1995.
[51] Int. Cl.⁶ .................... B60H 1/32; B60H 1/12; B60H 3/04
[52] U.S. Cl. .............. 165/41; 165/80.1; 62/244; 62/457.1; 62/457.9; 454/903
[58] Field of Search ............. 454/903; 62/244, 62/457.1, 457.9; 165/41, 80.1

[56] References Cited

U.S. PATENT DOCUMENTS

| | | | |
|---|---|---|---|
| 1,704,971 | 3/1929 | Howell | 454/903 |
| 3,280,896 | 10/1966 | Goodson et al. | 237/12.3 B |
| 4,478,052 | 10/1984 | McDowell | 62/244 |
| 4,653,289 | 3/1987 | Hodgetts | 62/244 |
| 4,892,137 | 1/1990 | Bibik, Jr. | 165/80.1 |
| 5,007,249 | 4/1991 | Van Druff, Jr. | 454/903 |
| 5,165,646 | 11/1992 | Gewecke | 62/244 |

FOREIGN PATENT DOCUMENTS

| | | | |
|---|---|---|---|
| 4-313636 | 11/1992 | Japan | 454/903 |

*Primary Examiner*—John K. Ford
*Attorney, Agent, or Firm*—Baker & Daniels

[57] ABSTRACT

A beverage cooler for heating and cooling beverages using a vehicle air conditioning system including a flexible hose with a securing attachment at one end to secure the hose to an outlet of the air conditioning system and a holding attachment at the other end for attachment to a standard beverage container. When the coupling attachment is attached to the air conditioning system outlet, the hose directs heated or cooled air through the holder and onto the beverage container to regulate the temperature of the beverage therein.

12 Claims, 3 Drawing Sheets

5,794,683

BEVERAGE COOLER FOR AUTOMOBILE

This application is based upon U.S. Provisional patent application Ser. No. 60/002825, filed Aug. 25, 1995.

This invention relates to a beverage cooler or warmer for use in automotive vehicles.

Vehicle occupants commonly desire either warm or cool beverages when riding in a vehicle. It is often difficult to maintain the temperature of warm or cool beverages in an automotive vehicle for an extended period of time. The present invention provides a flexible hose or duct which connects to the dash outlets of a automotive air conditioning and heating system. The other end of the hose is provided with a holder which attaches to either end of a standard beverage can. The can may be supported in the beverage tray mounted in the vehicle while attached to the holder. In this way, warm or cool air from the air conditioning and heating system outlet is directed through the hose to the holder to heat or cool whatever is placed in the beverage tray when the system is in operation.

Accordingly, it is an object of the present invention to provide a device to regulate the temperature of beverages, using the air conditioning and heating system of a vehicle.

Another object of the present invention is to provide a device for regulating the temperature of beverages for an extended period of time.

The above-mentioned and other objects and the advantages of this invention, and the manner of obtaining them, will become more apparent and the invention will be better understood by reference to the following description of embodiments of the invention taken in conjunction with the accompanying drawings, wherein:

FIG. 4 is a perspective view similar to FIG. 3, except that the beverage cooler of the present invention is attached to the bottom of a beverage container.

Figure 1:
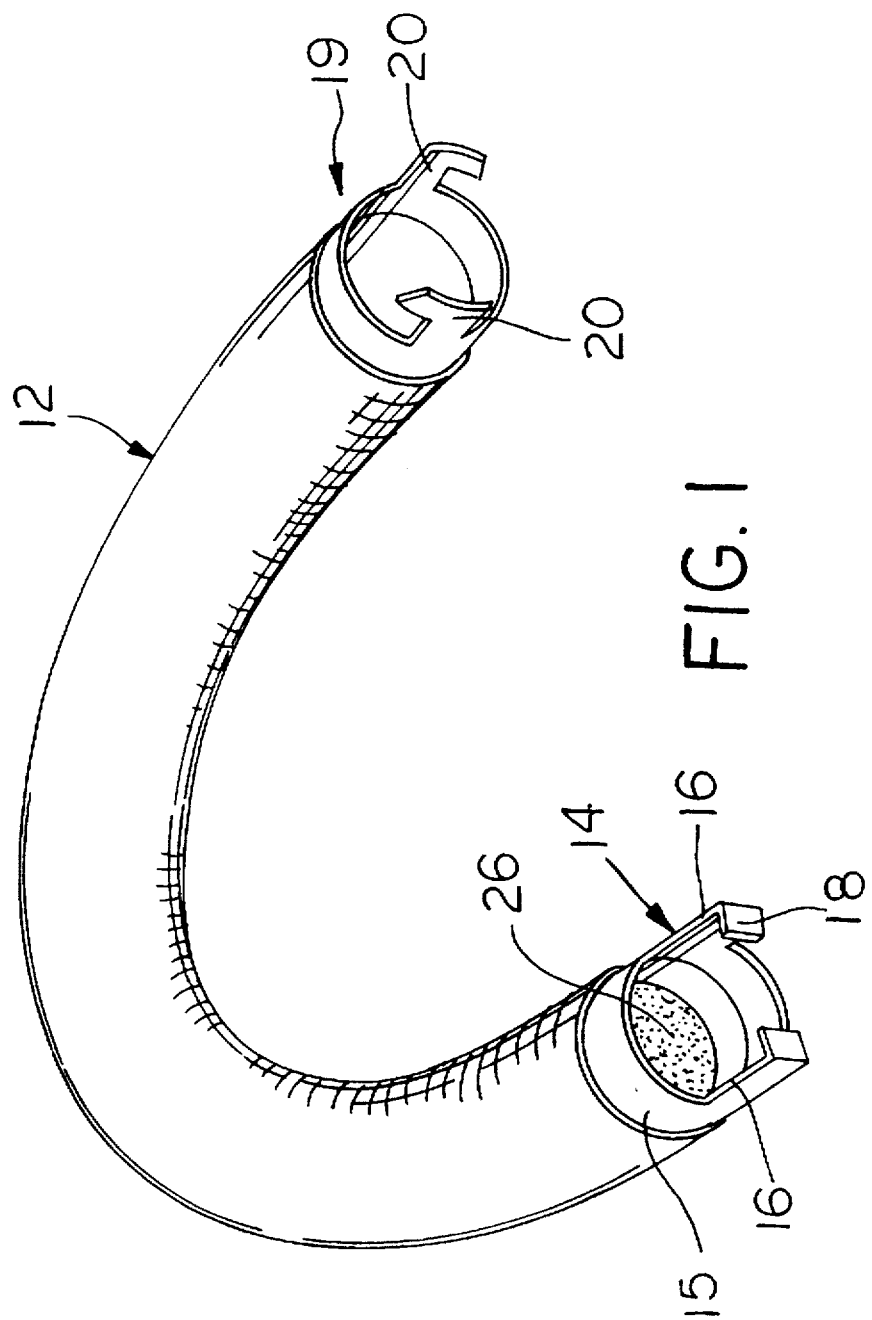
FIG. 1 is a perspective view of the beverage cooler according to the present invention.
Figure 2:
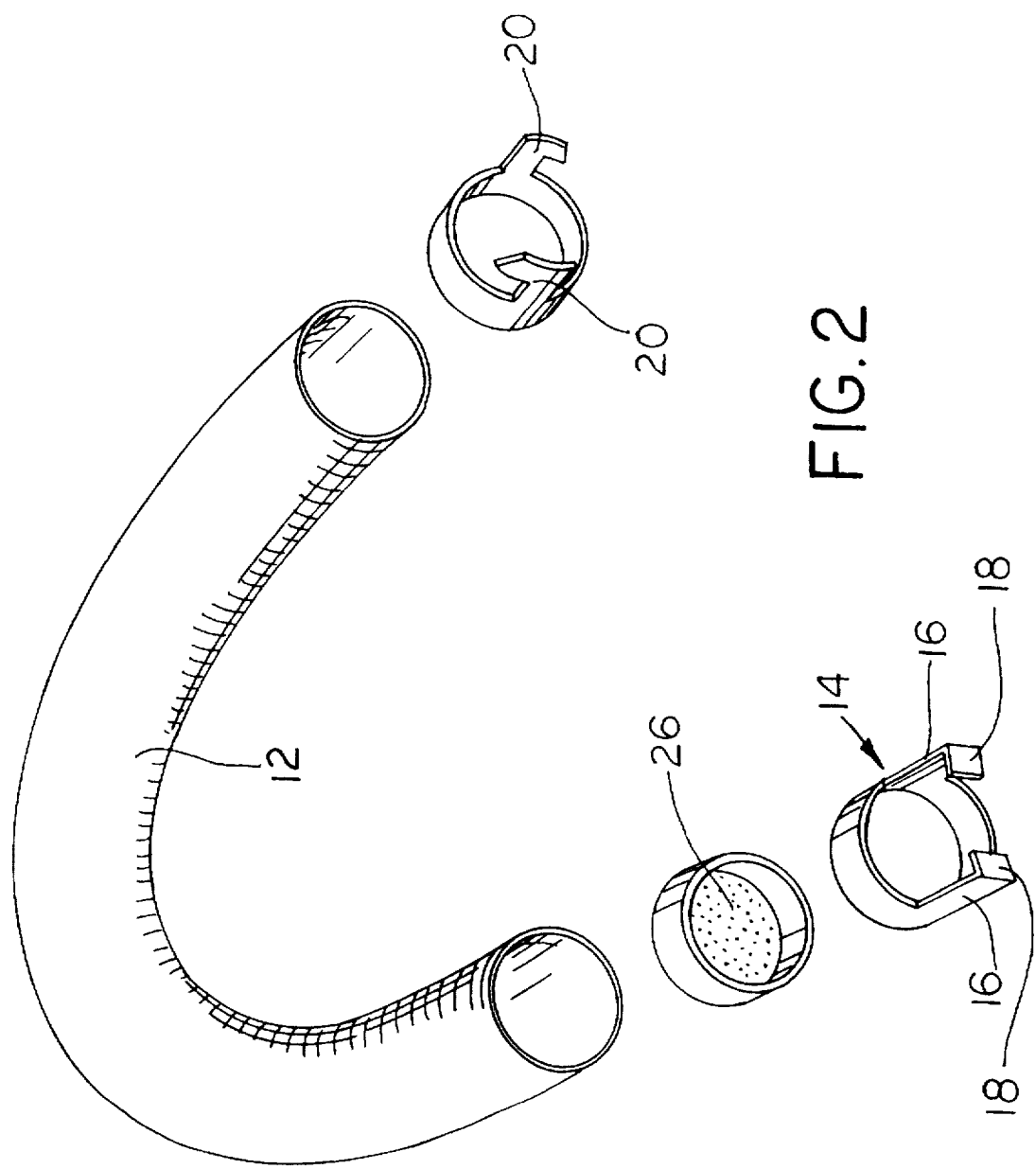
FIG. 2 is an exploded perspective view of the beverage cooler of the present invention.

Corresponding reference characters indicate corresponding parts throughout the several views. Although the drawings represent embodiments of the present invention, the drawings are not necessarily to scale and certain features may be exaggerated in order to better illustrate and explain the present invention.

Referring to FIG. 1 of the drawings, a conventional flexible hose 12 preferably constructed for collapsibility, is provided with a securing device or clip generally indicated by the numeral 14 having a base portion 15, arms 16 and inwardly directed fingers 18. The arms 16 may be deflected to permit the fingers 18 to be received in an air conditioning system outlet generally indicated 32. The arms 16, when released, permit fingers 18 to engage the vent grate 30 around outlet 32 to thereby retain the flexible hose 12 on the outlet. The opposite end of hose 12 is provided with a coupler generally designated 19 which includes prongs 20. Prongs 20 extend from cylindrical holder 21 and are adapted to engage opposite sides of a standard beverage container, such as a standard metal beverage can 22. Preferably, prongs 20 are curved to embrace the can 22 and may be spring loaded to grasp the latter. The can 22 is held in a standard cup tray 24 which extends from the dashboard 26 of the vehicle. A filter 26, which is a simple circular disk of porous filter material, is mounted in the end of hose 12 adjacent to securing device 14 to filter dust from the air discharged into the hose.

Figure 3:
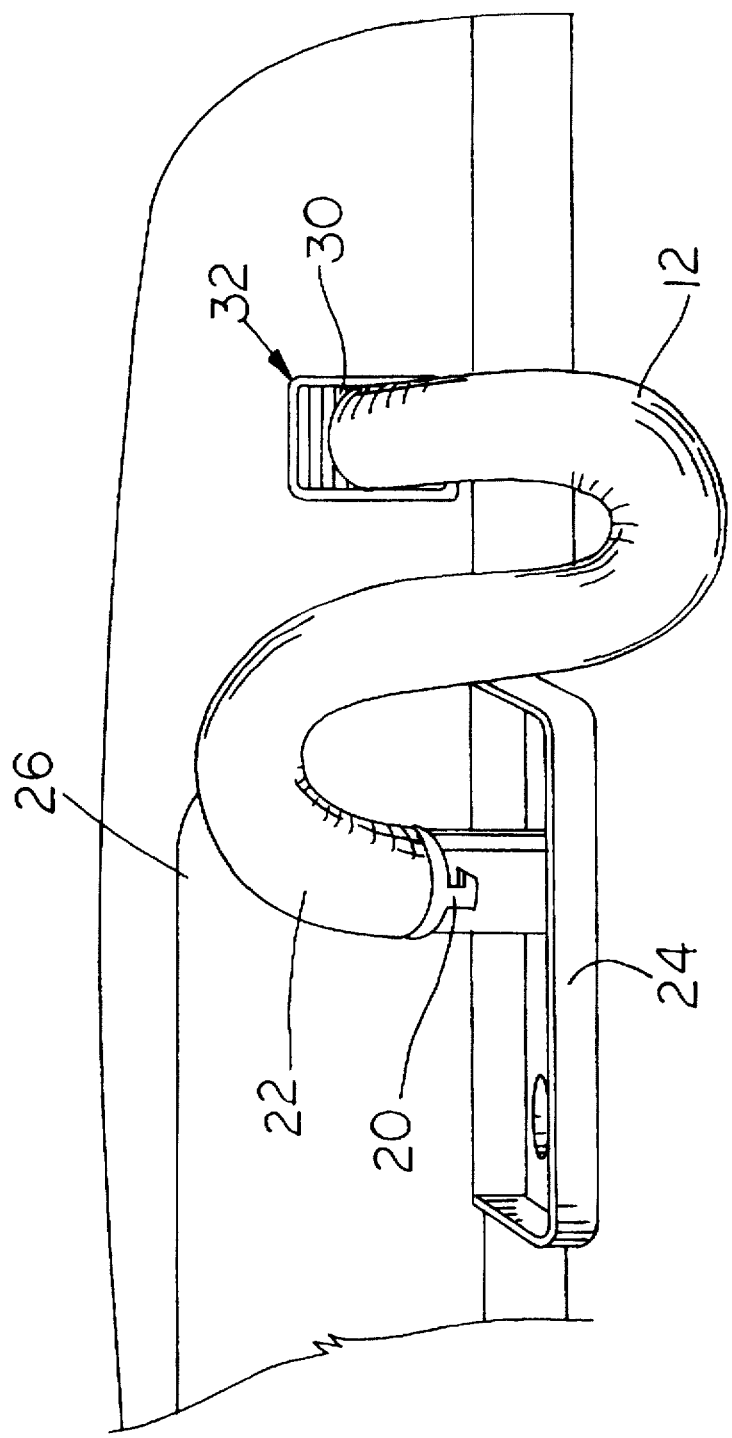
FIG. 3 is a perspective view of the beverage cooler of the present invention employed in the passenger compartment of a vehicle, shown attached to the top of a beverage container.

Accordingly, during operation of the vehicle air conditioner, cooled air is transferred to the can 22 through the hose 12, thereby cooling the can or maintaining it cooled. In cold weather, warmed air communicated through the hose 12 transmits warm air to the can 22 to warm the container. As shown in FIGS. 3 and 4, the hose 12 may be connected to the top portion of the circumferential surface of the can 22 (FIG. 3), or the bottom portion of the circumferential surface of the can 22 (FIG. 4).

While this invention has been described as having exemplary embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains and which fall within the limits of the appended claims.

What is claimed is:

1. A device for heating and cooling beverages used in conjunction with a vehicle air conditioning system in combination with a beverage container, said air conditioning system including an outlet for discharging heated and cooled air into the passenger compartment of the vehicle, said device comprising:

a hose, one end of said hose removably secured to said outlet; and means connected to the other end of said hose removably coupling said hose with said beverage container whereby said hose directs air from the vehicle air conditioning system onto said beverage container to affect the temperature of the beverage therein, said coupling means including a holder connected to said other hose end and slid over an end of said beverage container to expose another end of said beverage container for drinking.

2. The device of claim 1, said outlet being covered by a vent grate, said securing means including resilient arms extending axially from said one end, each of said arms having a finger extending therefrom, said fingers releasably engaging said vent grate.

3. The device of claim 2, said securing means also including a ring-shaped base portion fitted onto said one end, said base portion supporting said arms.

4. The device of claim 3, said securing means having two arms oppositely disposed on said base, each said finger extending inwardly toward the opposing finger to engage said vent grate.

5. The device of claim 1, said hose being axially collapsible whereby the length of said hose is adjustable.

6. A device for heating and cooling beverages for attachment to a vehicle air conditioning system, said air conditioning system including an outlet for discharging heated and cooled air into the passenger compartment of the vehicle, said device comprising:

a hose;

means connected to one end of said hose for removably securing said hose to said outlet;

means connected to the other end of said hose removably coupling said hose with a standard beverage container, whereby said hose directs air from the vehicle air conditioning system onto the beverage container to change the temperature of the beverage therein; and a filter connected to said hose to filter air directed therethrough.

7. The device of claim 6, said filter being removably disposed within said hose and including a frame substantially conforming to the inside dimensions of said hose, said frame having a mesh extending thereacross.

8. A device for heating and cooling beverages for attachment to a vehicle air conditioning system, said air conditioning system including an outlet for discharging heated and cooled air into the passenger compartment of the vehicle, said device comprising:

means connected to one end of said hose for removably securing said hose to said outlet; and means connected to the other end of said hose for removably coupling said hose with a standard beverage container, whereby said hose directs air from the vehicle air conditioning system onto the beverage container to change the temperature of the beverage therein, said coupling means including a hollow, cylindrical holder extending axially outwardly from said other end to slide over an end of the beverage container.

9. The device of claim 8, said holder having a pair of opposed prongs extending therefrom to engage the beverage container.

10. The device of claim 9, said prongs having a curved surface to conform to the shape of the beverage container.

11. The device of claim 9, said prongs extending partly inwardly toward one another to generate an inward bias when spread to engage the beverage container.

12. A device for heating and cooling beverages for attachment to a vehicle air conditioning system, said air conditioning system including an outlet for discharging heated and cooled air into the passenger compartment of the vehicle, said device comprising:

a hose;

means connected to one end of said hose for removably securing said hose to said outlet; and means connected to the other end of said hose for removably coupling said hose with a standard beverage container whereby said hose directs air from the vehicle air conditioning system onto the beverage container to affect the temperature of the beverage therein, said coupling means including a holder connected to one of said ends to slide over an end of the beverage container, said holder including spaced prongs constituting means for compressively engaging the beverage container at its sides with at least a portion of said beverage container thereby extending from said holder.

* * * * *